United States Patent
Nakasone et al.

(10) Patent No.: US 9,533,594 B2
(45) Date of Patent: Jan. 3, 2017

(54) VEHICLE-MOUNTED APPARATUS, CHARGER/DISCHARGER, AND CHARGE/DISCHARGE SYSTEM

(71) Applicant: PANASONIC CORPORATION, Osaka (JP)

(72) Inventors: Haruka Nakasone, Osaka (JP); Akira Baba, Osaka (JP); Hitoshi Nomura, Osaka (JP); Yasuhiro Yanagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 14/380,326

(22) PCT Filed: Feb. 20, 2013

(86) PCT No.: PCT/JP2013/000945
§ 371 (c)(1),
(2) Date: Aug. 21, 2014

(87) PCT Pub. No.: WO2013/125217
PCT Pub. Date: Aug. 29, 2013

(65) Prior Publication Data
US 2015/0061592 A1    Mar. 5, 2015

(30) Foreign Application Priority Data

Feb. 23, 2012 (JP) .................. 2012-037199

(51) Int. Cl.
*H02J 7/00* (2006.01)
*B60L 11/18* (2006.01)

(52) U.S. Cl.
CPC .......... *B60L 11/1846* (2013.01); *B60L 11/184* (2013.01); *B60L 11/1816* (2013.01);
(Continued)

(58) Field of Classification Search
CPC . B60L 11/1816; B60L 11/1824; B60L 11/184; B60L 11/1842; B60L 11/1844; B60L 11/1846; B60L 11/1848; B60L 2230/16; B60L 2230/40; B60L 3/12; Y02E 60/721; Y02T 10/7005; Y02T 10/7088; Y02T 90/14
See application file for complete search history.

(56) References Cited

U.S. PATENT DOCUMENTS

2008/0157777 A1\* 7/2008 Yamabe ............. G01R 31/3648
324/426
2009/0144150 A1    6/2009 Sakakibara et al.
(Continued)

FOREIGN PATENT DOCUMENTS

JP    2009-141991 A    6/2009
JP    2010-268576 A    11/2010
(Continued)

OTHER PUBLICATIONS

Shiga Iwabuchi, "Energy Management System for EV based on User Behavior Induction", IEICE Technical Report, Feb. 16, 2012, vol. 111, No. 444, pp. 47-52.
(Continued)

*Primary Examiner* — Vuthe Siek
(74) *Attorney, Agent, or Firm* — McDermott Will & Emery LLP

(57) ABSTRACT

A vehicle-mounted apparatus comprising: a communication unit which is connected to the charger/discharger and exchanges information with the charger/discharger; an input unit receiving various types of information; a storage unit which uses the information acquired through the input unit and the communication unit to store: a vehicle ID identifying the vehicle; a charger/discharger ID identifying the charger/discharger which can be connected to the vehicle; and history information indicating a history of charges and
(Continued)

discharges for the vehicle, which are related to one another; and a presentation unit presenting to a user of the vehicle, the history information stored in the storage unit in relation to a pair of the vehicle ID and the charger/discharger which charges/discharges the vehicle and is identified by the charger/discharger ID.

10 Claims, 9 Drawing Sheets

(52) U.S. Cl.
CPC ....... *B60L 11/1824* (2013.01); *B60L 11/1842* (2013.01); *B60L 11/1844* (2013.01); *B60L 11/1848* (2013.01); *H02J 7/0027* (2013.01); *B60L 2210/10* (2013.01); *B60L 2210/30* (2013.01); *B60L 2210/40* (2013.01); *B60L 2230/16* (2013.01); *B60L 2230/22* (2013.01); *B60L 2230/28* (2013.01); *B60L 2230/40* (2013.01); *B60L 2240/34* (2013.01); *B60L 2240/622* (2013.01); *B60L 2240/70* (2013.01); *B60L 2250/10* (2013.01); *B60L 2260/56* (2013.01); *B60L 2270/32* (2013.01); *B60L 2270/34* (2013.01); *H02J 2007/0098* (2013.01); *Y02E 60/721* (2013.01); *Y02T 10/7005* (2013.01); *Y02T 10/7055* (2013.01); *Y02T 10/7088* (2013.01); *Y02T 10/7216* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| 2009/0192655 A1 | 7/2009 | Ichikawa et al. | |
|---|---|---|---|
| 2010/0076825 A1* | 3/2010 | Sato | B60L 3/12 705/14.1 |
| 2011/0191266 A1* | 8/2011 | Matsuyama | G06Q 50/06 705/412 |
| 2011/0241824 A1* | 10/2011 | Uesugi | B60L 11/1824 340/5.8 |
| 2012/0086397 A1* | 4/2012 | Obayashi | H02J 3/32 320/109 |
| 2012/0112696 A1 | 5/2012 | Ikeda et al. | |

FOREIGN PATENT DOCUMENTS

| JP | 2011-227541 A | 11/2011 |
|---|---|---|
| WO | 2008/023536 A1 | 2/2008 |
| WO | 2011/007573 A1 | 1/2011 |
| WO | 2011/042785 A1 | 4/2011 |

OTHER PUBLICATIONS

International Search Report issued in International Application No. PCT/JP2013/000945 with Date of mailing May 14, 2013, with English Translation.

\* cited by examiner

| DATE OF CHARGE/ DISCHARGE | CHARGER/ DISCHARGER ID | AMOUNT OF CHARGE/ DISCHARGE [kWh] | ELECTRICITY RATE [YEN/kWh] | CHARGE/ DISCHARGE COST [YEN] | FUEL COST (TOTAL) [YEN] |
|---|---|---|---|---|---|
| 1/1 18:00 | XXX | 2 | 20 | 40 | 40 |
| 1/2 1:00 | YYY | 8 | 10 | 80 | 120 |
| 1/3 13:00 | XXX | -4 | 30 | -120 | 0 |
| : | | | | | |

| GROUP ID | CHARGER/ DISCHARGER ID | ELECTRICITY RATE [YEN/KWh] |
|---|---|---|
| A | a1 | 20 |
| A | a2 | 20 |
| B | b1 | 10 |
| B | b2 | 10 |
| : | | |

(a)

(b)

| VEHICLE ID | CHARGE/DISCHARGE AMOUNT [kWh] | EV OPERATION | REMAINING BATTERY POWER [Wh] |
|---|---|---|---|
| XXX | 20 | CHARGE | 20 |
| — | -5 | TRAVEL | 15 |
| YYY | 10 | CHARGE | 25 |
| — | -15 | TRAVEL | 10 |
| ZZZ | 10 | CHARGE | 20 |
| XXX | 5 | CHARGE | 25 |
| XXX | -25 | DISCHARGE | 0 |
| ⋮ | | | |

(a) CHARGER LOCATION INFORMATION

| CHARGER/<br>DISCHARGER ID | LATITUDE | LONGITUDE |
|---|---|---|
| 1 | N xx.xx | E yy.yy |

(b) DESTINATION INFORMATION

| VEHICLE ID | LATITUDE | LONGITUDE |
|---|---|---|
| A | N xx.xx | E yy.yy |
| B | N xx.xx | E yy.yy |
| C | N xx.xx | E yy.yy |

| DATA ACQUISITION DATE | VEHICLE ID | AMOUNT OF DISCHARGE (BY TRAVEL) [kWh] | TRAVEL DISTANCE [km] | AVERAGE MILEAGE [km/kWh] |
|---|---|---|---|---|
| 1/1 17:00 | XXX | 10 | 100 | 10 |
| 1/2 20:00 | XXX | 5 | 30 | 6 |
| : | | | | |

VEHICLE-MOUNTED APPARATUS, CHARGER/DISCHARGER, AND CHARGE/DISCHARGE SYSTEM

RELATED APPLICATIONS

This is the national phase of International Application No. PCT/JP2013/000945, with an international filing date of Feb. 20, 2013, which claims priority of Japanese Patent Application No. 2012-037199, filed on Feb. 23, 2012, the contents of each of which are hereby incorporated by reference.

TECHNICAL FIELD

The present invention relates to a vehicle-mounted apparatus, a charger/discharger, and a charge/discharge system for charge and discharge by electricity.

BACKGROUND ART

One of the known home systems provided with solar cells is an invention described in Patent Literature 1, for example. Patent Literature 1 describes about the following operation. The home system calculates an amount of photovoltaic electricity predicted and an amount of charge predicted for a vehicle's rechargeable battery and supplies the photovoltaic electricity to the vehicle's rechargeable battery if the rechargeable battery needs to be charged. When the amount of photovoltaic electricity predicted is larger than the amount of charge predicted, the home system supplies the surplus electricity to house loads. When the amount of photovoltaic power predicted is larger than the sum of the amount of charge predicted and the house loads, the home system supplies the surplus electricity to a house-side rechargeable battery. When there is still surplus electricity, the home system sells the surplus electricity.

In order to urge effective use of electricity in the house like Patent Literature 1, it is necessary to develop an environment where the user can easily use the vehicle.

CITATION LIST

Patent Literature

Patent Literature 1: Japanese Patent Laid-open Publication No. 2010-268576

SUMMARY OF INVENTION

A vehicle-mounted apparatus according to a first aspect of the present invention is a vehicle-mounted apparatus mounted in a vehicle which can be charged and discharged by a charger/discharger, the apparatus including: a communication unit which is connected to the charger/discharger and exchanges information with the charger/discharger; an input unit receiving various types of information; a storage unit which uses the information acquired through the input unit and the communication unit to store: a vehicle ID identifying the vehicle; a charger/discharger ID identifying the charger/discharger which can be connected to the vehicle; and history information indicating a history of charges and discharges for the vehicle, which are related to one another; and a presentation unit presenting to a user of the vehicle, the history information stored in the storage unit in relation to a pair of the vehicle ID and the charger/discharger which charges/discharges the vehicle and is identified by the charger/discharger ID.

A vehicle-mounted apparatus according to a second aspect of the present invention is the vehicle-mounted apparatus according to the first aspect, in which the vehicle-mounted apparatus acquires an area ID identifying an area where the charger/discharger charging/discharging the vehicle is placed and a charge/discharge cost of the area through the input unit or the communication unit, the storage unit stores the area ID and the charge/discharge cost in relation to the charger/discharger ID, and the presentation unit presents the area identified by the area ID and the charge/discharge cost as the history information in relation to a pair of the charger/discharger ID related to the area and the vehicle ID.

A vehicle-mounted apparatus according to a third aspect of the present invention is the vehicle-mounted apparatus according to the first or second aspect, in which the communication unit sends the vehicle ID stored in the storage unit to the charger/discharger when the vehicle is connected to the charger/discharger, and charging/discharging operation is permitted when the vehicle ID sent from the communication unit is registered in the charger/discharger in relation to the charger/discharger ID, and the charging/discharging operation is prohibited when the vehicle ID sent from the communication unit is not registered in the charger/discharger in relation to the charger/discharger ID.

A vehicle-mounted apparatus according to a fourth aspect of the present invention is the vehicle-mounted apparatus according to any one of the first to third aspects, in which the vehicle-mounted apparatus starts operation corresponding to the behavior of the user of the vehicle in accordance with an instruction which is sent from a home appliance and is supplied through the charger/discharger.

A vehicle-mounted apparatus according to a fifth aspect of the present invention is the vehicle-mounted apparatus according to any one of the first to fourth aspects, in which the communication unit sends the vehicle ID stored in the storage unit to the charger/discharger when the vehicle is connected to the charger/discharger, and the vehicle is allowed to discharge electricity within a range not exceeding a previous amount of charge to the vehicle from the connected charger/discharger.

A vehicle-mounted apparatus according to a sixth aspect of the present invention is the vehicle-mounted apparatus according to any one of the first to fifth aspects, in which the vehicle provided with the vehicle-mounted apparatus is connected to the charger/discharger together with another vehicle, and the amount of charge to the vehicle provided with the vehicle-mounted apparatus is set based on the current location and destination of the vehicle including the vehicle-mounted apparatus.

A charger/discharger according to a seventh aspect of the present invention is a charger/discharger charging/discharging a battery of a vehicle, including: a communication unit which is connected to the vehicle and exchanges information with the vehicle; an input unit which receives various types of information; and a storage unit which uses the information acquired through the input unit and the communication unit to store: vehicle IDs identifying vehicles; a charger/discharger ID identifying the charger/discharger; and history information indicating a history of charges and discharges of each vehicle ID, which are related to one another; and a presentation unit presenting to a user of the vehicle, the history information stored in the storage unit on a basis of each vehicle ID.

A charger/discharger according to an eighth aspect of the present invention is the charger/discharger according to the seventh aspect, in which, when being connected to a vehicle, the communication unit receives a vehicle ID from the connected vehicle, charging/discharging operation is permitted when the vehicle ID sent from the communication unit is registered in relation to the charger/discharger ID and is prohibited when the vehicle ID sent from the communication unit is not registered in relation to the charger/discharger ID.

A charger/discharger according to a ninth aspect of the present invention is the charger/discharger according to the seventh or eighth aspect, in which the communication unit sends an instruction received from a home appliance to a vehicle and sends the matter that the vehicle is connected to the home appliance, and the charger/discharger causes the charger/discharger to start operation corresponding to the behavior of the user of the vehicle in accordance with the instruction and causes the home appliance to start operation corresponding to the behavior of the user of the vehicle upon connection of the vehicle.

A charger/discharger according to a tenth aspect of the present invention is the charger/discharger according to any one of the seventh to ninth aspects, in which, when being connected to a vehicle, the communication unit receives a vehicle ID from the vehicle, and the vehicle is caused to discharge electricity within a range not exceeding the previous amount of charge.

A charger/discharger according to an eleventh aspect of the present invention is the charger/discharger according to any one of the seventh to tenth aspects, in which the charger/discharger is connected to a plurality of vehicles. When being connected to the plurality of vehicles, the communication unit acquires vehicle IDs and destination information from the plurality of vehicles, and the amount of charge of each vehicle is set so that the vehicle can move a travel distance which is calculated based on the location of the charger/discharger and the destination information.

A charge/discharge system according to a twelfth aspect of the present invention is a charge/discharge system including: a vehicle-mounted apparatus mounted in a vehicle; and a charger/discharger charging/discharging a battery of the vehicle, in which the vehicle-mounted apparatus and the charger/discharger include communication units exchanging information with each other, each or any one of the vehicle-mounted apparatus and the charger/discharger includes: an input unit receiving various types of information; a storage unit which uses the information acquired through the input unit and the communication unit to store a vehicle ID identifying the vehicle, a charger/discharger ID identifying the charger/discharger which can be connected to the vehicle; and history information indicating a history of charges and discharges for the vehicle; and a presentation unit presenting the history information stored in the storage unit to a user of the vehicle in relation to a pair of the vehicle ID and the charger/discharger which charges/discharges the vehicle and is identified by the charger/discharger ID.

BRIEF DESCRIPTION OF DRAWINGS

FIGS. 12A and 12B show information stored in the charger/discharger of the charge/discharge system as the sixth embodiment of the present invention, FIG. 12A showing charger location information, FIG. 12B showing destination information.

MODES FOR CARRYING OUT THE INVENTION

Hereinafter, a description is given of embodiments of the present invention with reference to the drawings.

(First Embodiment)

Figures 1, 2:
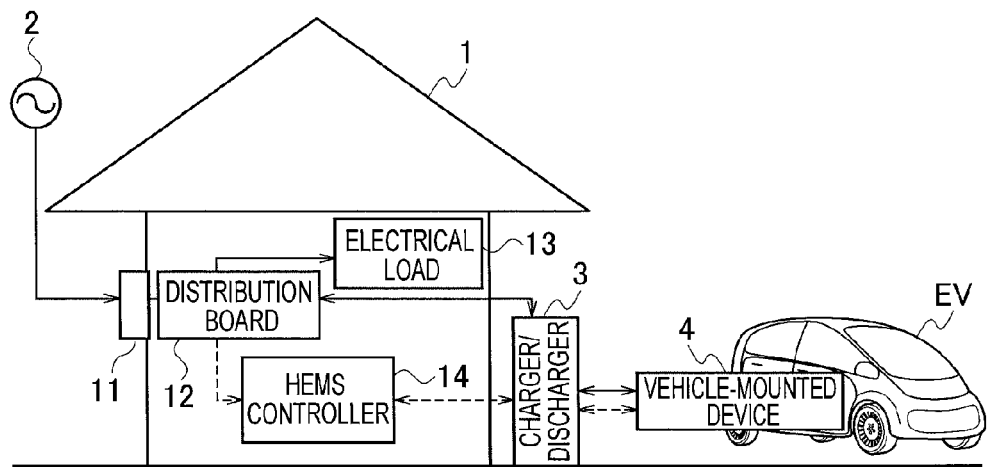
FIG. 1 is a block diagram illustrating the configuration of a charge/discharge system as a first embodiment of the present invention.
FIG. 2 is a view showing a basic storage table in the charge/discharge system as the first embodiment of the present invention.

A charge/discharge system shown as a first embodiment of the present invention is configured as illustrated in FIG. 1, for example. In this charge/discharge system, a house 1 connected to a grid power supply 2 is connected to a charger/discharger 3. In the charge/discharge system, the charger/discharger 3 can be connected to an electric vehicle (EV).

The house 1 is provided with an electricity meter 11, a distribution board 12, an electrical load (a home appliance) 13, and an HEMS (home energy management system) controller 14. The house 1 may be also provided with solar or fuel cells. When the house 1 is provided with solar or fuel cells, the solar or fuel cells are connected to the distribution board 12 through a DC/DC converter or a DC/AC converter.

The charge/discharge system supplies electricity from the grid power supply 2 to the electrical load 13 via the power meter 11 and distribution board 12. The charge/discharge system can exchange electricity between the distribution board 12 and charger/discharger 3. The exchange of electricity between the distribution board 12 and charger/discharger 13 is controlled by the HEMS controller 14.

The charger/discharger 3 includes a DC/DC converter, a DC/AC converter, and the like. The charger/discharger 3 performs charging operation and discharging operation for the electric vehicle. The charging operation of the charger/discharger 3 is: converting electricity supplied from the distribution board 12 to electricity suitable for charging the electric vehicle; and supplying the same to the electric vehicle. The discharging operation of the charger/discharger 3 is: converting electricity supplied from the electric vehicle to electricity suitable for the distribution board 12; and supplying the same to the distribution board 12.

The charger/discharger 3 can be attached to and detached from the electric vehicle though a cable. The cable includes a power line and a communication line, for example. The charger/discharger 3 exchanges electricity with the electric vehicle through the cable. At the same time, the charger/discharger 3 can exchange information with the electric vehicle through the cable. The charger/discharger 3 may exchange information with the electric vehicle by using a signal line different from the power line, a radio technology, or the like.

The charger/discharger 3 is connected to the HEMS controller 14. The charger/discharger 3 exchanges information with the HEMS controller 14 and performs the charging operation and discharging operation for the electric vehicle in accordance with control of the HEMS controller 14.

The charger/discharger 3 includes a communication unit, an input unit, a storage unit, and a presentation unit. The communication unit exchanges information when being connected to a vehicle-mounted device (vehicle-mounted apparatus) 4 of the electric vehicle. The communication unit is a communication I/F connected to the communication line included in the cable, a wireless I/F, or the like, for example. The input unit receives various types of information. The input unit includes buttons accepting user's operation and the like, for example.

The storage unit uses the information acquired by the input unit and communication unit to store a vehicle ID which identifies each electric vehicle, a charger/discharger ID which identifies the charger/discharger 3, and history information indicating the history of charges and discharges of the electric vehicle, which are related to one another. The storage unit is a built-in hard disk device or the like. The storage unit may be a memory in the house 1 accessible by the charger/discharger 3.

The presentation unit presents the history information stored in the storage unit to the vehicle user on a basis of vehicle IDs. This presentation unit includes a display and a speaker provided on the casing surface and the like.

The electric vehicle moves by using electricity charged in an on-board battery built in the vehicle. The electric vehicle includes the vehicle-mounted device 4 controlling charge/discharge for the on-board battery.

The vehicle-mounted device 4 includes a communication unit, an input unit, a storage unit, and a presentation unit. The communication unit exchanges information when being connected to the charger/discharger 3. The communication unit is a wire communication I/F connected to the communication line incorporated in the cable, a wireless communication I/F for wireless communication, or the like, for example. The input unit receives various types of information. The input unit includes buttons which are provided for a navigation system and receives user's operation.

The storage unit uses the information acquired by the input unit and communication unit to store a vehicle ID which identifies the vehicle (EV), a charger/discharger ID which identifies the charger/discharger 3 which can be connected to the electric vehicle, and history information indicating the history of charges and discharges of the electric vehicle, which are related to one another. The storage unit is a hard disk device provided for the navigation system or the like.

The presentation unit presents the history information stored in the storage unit to the vehicle user in relation to the pair of the vehicle ID and the charger/discharger 3 which performs charge/discharge and is identified by the charger/discharger ID. The presentation unit includes a display and a speaker of a navigation system.

The charge/discharge system performs a charging/discharging operation as shown by steps (1) to (8).

First, in (1), the electric vehicle is connected to the charger/discharger 3 through the cable.

Next (2), an instruction to execute charge of the electric vehicle is inputted to the charger/discharger 3. The charger/discharger 3 is provided with an operation button to give an instruction to start charge, for example. Upon the user's operation for the operation button, the charger/discharger 3 executes charge to the electric vehicle. Moreover, the charger/discharger 3 may start charge to the electric vehicle by a timer setting. The instruction to execute charge is inputted in the charger/discharger 3 side as described above but may be inputted through the vehicle-mounted device 4 or a terminal carried by the user.

Next (3), the charger/discharger 3 communicates with the vehicle-mounted device 4 (through the communication unit) and notifies the vehicle-mounted device 4 of the execution of charging.

Next (4), the charger/discharger 3 charges the vehicle-mounted battery of the electric vehicle. In this process, the charger/discharger 3 is supplied with the grid power from the distribution board 12 and performs DC/AC conversion, DC/DC conversion, and the like for the supplied grid power.

Next (5), the charger/discharger 3 measures the amount of charge. The charger/discharger 3 acquires an electricity rate at charging from the HEMS controller 14. The charger/discharger 3 multiplies the measured amount of charge by the electricity rate to calculate a charge cost required for the current charging operation. The calculation of the charge cost is performed by the charger/discharger 3 as described above but may be performed by the vehicle-mounted device 4.

Next (6), the charger/discharger 3 transmits to the vehicle-mounted device 4, information including the date and time of charge, the charger/discharger ID, the amount of charge, the electricity rate, and the charge cost.

Next (7), the current charging cost is added to a counter of fuel cost. This step may be performed by any of the vehicle-mounted device 4, charger/discharger 3, and HEMS controller 14.

Next (8), the total fuel cost accumulated is presented by the vehicle-mounted device 4, charger/discharger 3, or HEMS controller 14.

The charger/discharge system performs a discharging operation as shown by steps (1) to (8).

First in step (1), the electric vehicle is connected to the charger/discharger 3 through the cable.

Next (2), an instruction to execute discharge from the electric vehicle is inputted in the charger/discharger 3. The charger/discharger 3 is provided with an operation button giving an instruction to start discharge, for example. Upon the user's operation of the operation button, the charger/discharger 3 executes discharge of the electric vehicle. Moreover, the charger/discharger 3 may perform discharge from the electric vehicle by timer setting. The instruction to execute discharge from the electric vehicle is inputted on the charger/discharger 3 side as described above but may be inputted by the vehicle-mounted device 4 or a terminal carried by the user.

Next (3), the charger/discharger 3 communicates with the vehicle-mounted device 4 (through the communication unit) to notify the vehicle-mounted device 4 of execution of discharge.

Next (4), the charger/discharger 3 performs discharge from the vehicle-mounted battery of the electric vehicle to the charger/discharger 3. In this step, the charger/discharger 3 is supplied with DC power from the electric vehicle and performs DC/DC conversion, DC/AC conversion, and the like for the supplied DC power.

Next (5), the charger/discharger 3 measures the amount of discharge. The charger/discharger 3 acquires an electricity rate for discharge from the HEMS controller 14. The charger/discharger 3 multiplies the measured amount of discharge by the electricity rate to calculate a discharge cost which is obtained by the current discharging operation. The calculation of the discharge cost is performed by the charger/discharger 3 as described above but may be performed by the vehicle-mounted device 4.

Next (6), the charger/discharger 3 transmits to the vehicle-mounted device 4, information including the date and time of discharge, the charger/discharger ID, the amount of discharge, the electricity rate, and the discharge cost.

Next (7), the current discharge cost is reduced from the counter of fuel cost. This step may be performed by any one of the vehicle-mounted device 4, charger/discharger 3, and HEMS controller 14.

Next (8), the vehicle-mounted device 4, charger/discharger 3, or HEMS controller 14 presents the total fuel cost accumulated.

In this charge/discharge system, the storage units of the charger/discharger 3 and the vehicle-mounted device 4 store a basic storage table as shown in FIG. 2, for example. In this basic storage table, the date and time of charge/discharge, the charger/discharger ID, the amount of charge/discharge, the electricity rate, the charge/discharge cost, and the fuel cost (total value) are related to one another. This basic storage table shows the amount of charge and charge cost by positive values and shows the amount of discharge and discharge cost by negative values.

The basic storage table only needs to store history information of the charging and discharging operations for a predetermined period of times or over a predetermined time period. For example, the history information may include charging and discharging operations either for the past 24 times or over the past six months.

The basic storage table is stored in the storage units of the charger/discharger 3 and vehicle-mounted device 4 and is read out at the process of presenting the information. Accordingly, the charge/discharge system manages the amounts of charge/discharge of the electric vehicle and the electricity rate on a basis of the vehicle ID and charger/discharger ID to implement visualization of the cost required for charge and discharge. This can prepare the environment where the user can easily use an electric vehicle and thereby promote effective use of electricity in the house 1.

This charge/discharge system can visualize the $CO_2$ emission required for charge and discharge by managing the unit amount of charge/discharge and unit $CO_2$ emission of each electric vehicle. In this process, the $CO_2$ emission coefficient that refers to an amount of $CO_2$ emission for a unit amount of charge/discharge is acquired from the HEMS controller 14.

In this charge/discharge system, the vehicle-mounted device 4 can be charged by a plurality of the charger/dischargers 3. For example, the vehicle-mounted device 4 is charged/discharged by the charger/discharger 3 placed at the owner's house and is sometimes charged by the charger/dischargers 3 placed outside. Also in this case, the vehicle-mounted device 4 acquires the charger/discharger ID of the charger/discharger 3 connected thereto. The vehicle-mounted device 4 stores the history of charges and discharges in relation to the acquired charger/discharger ID. When being connected to a charger/discharger 3 set as the default in advance, the vehicle-mounted device 4 sends the history of past charges and discharges to the charger/discharger 3. The charger/discharger set as the default is the charger/discharger 3 that the owner of the electric vehicle uses at the owner's house, for example. Even when being charged by the charger/discharger 3 located at a place other than the vehicle owner's house, the vehicle-mounted device 4 thereby recognizes that the connected charger/discharger 3 is not the charger/discharger 3 mainly used. The vehicle-mounted device 4 can acquire the charger/discharger ID, the amount of charge, and the electricity rate from the charger/discharger 3 located at a place other than the vehicle owner's house. The charge/discharge system transmits the history of charges and discharges, including charges at places other than the house 1, to the charger/discharger 3 of the house 1 and the HEMS controller 14. The charge/discharge system can therefore present the history of charges and discharges including charges at places other than the house 1.

Moreover, the charge/discharge system may present a history (the charge/discharge cost and $CO_2$ emissions) of charges and discharges for the electric vehicle by plural charger/dischargers 3 or may present a history of charges and discharges of the electric vehicle by a specific one of the charger/dischargers 3 (placed at the house 1).

(Second Embodiment)

Next, a description is given of a charge/discharge system shown as a second embodiment of the present invention. The same portions as those of the aforementioned embodiment are given the same reference numerals, and the detailed description thereof is omitted.

Figure 3:
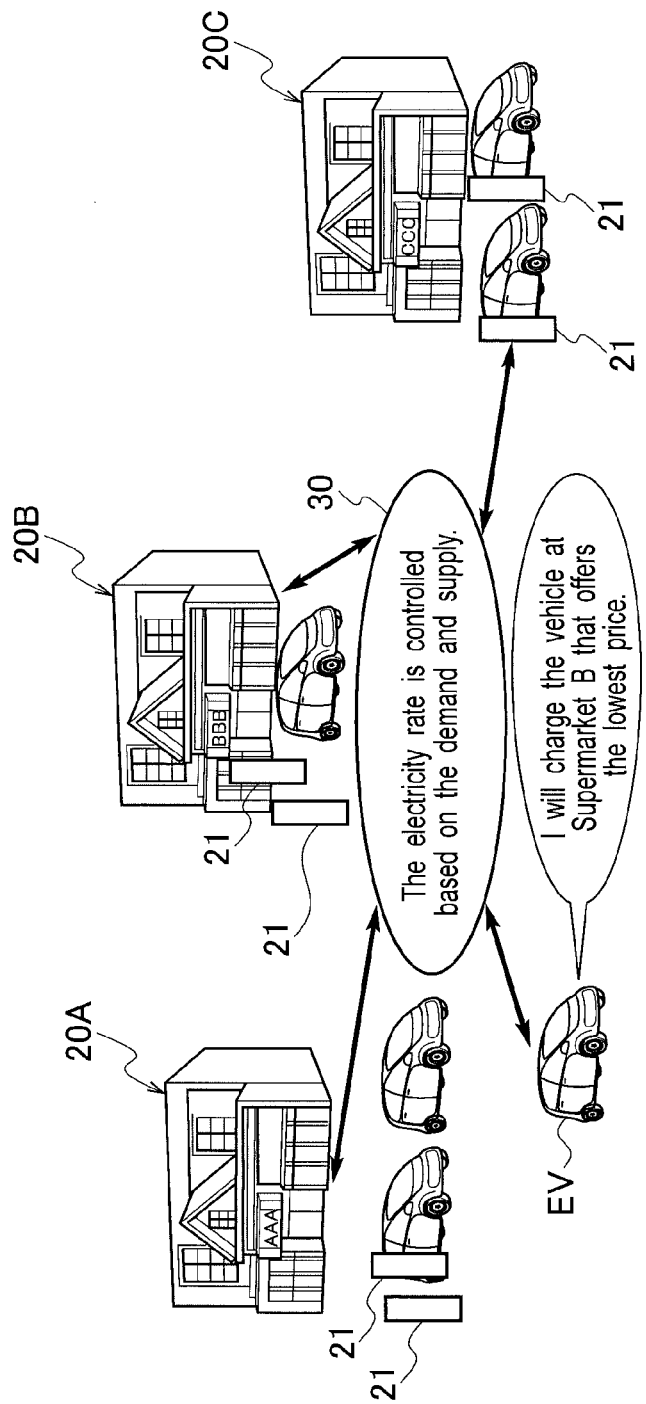
FIG. 3 is a view illustrating the configuration of a charge/discharge system as a second embodiment of the present invention.

The charge/discharge system shown as the second embodiment is configured to present the history of charges and discharges including areas where the charger/dischargers 3 are provided. In this charge/discharge system, as illustrated in FIG. 3, plural shops 20A, 20B, and 20C are connected to a NW service system 30. The NW service network 30 collects information of multiple chargers 21 provided at the shops 20A, 20B, and 20C. The NW service network 30 includes an information collection server (energy management center) that collects information from the chargers 21 via the Internet or the like. This information collection server includes a communication function capable of communicating with the multiple chargers 21 and vehicle-mounted devices 4 of multiple electric vehicles.

Each of the chargers 21 stores a charger/discharger ID identifying the charger 21 and an area ID identifying the area where the charger 21 is provided. The area ID may be provided for other than a specific area on a map. For example, the area ID may be a group ID identifying a group including plural chargers 21 provided for shops.

Figures 4, 5:
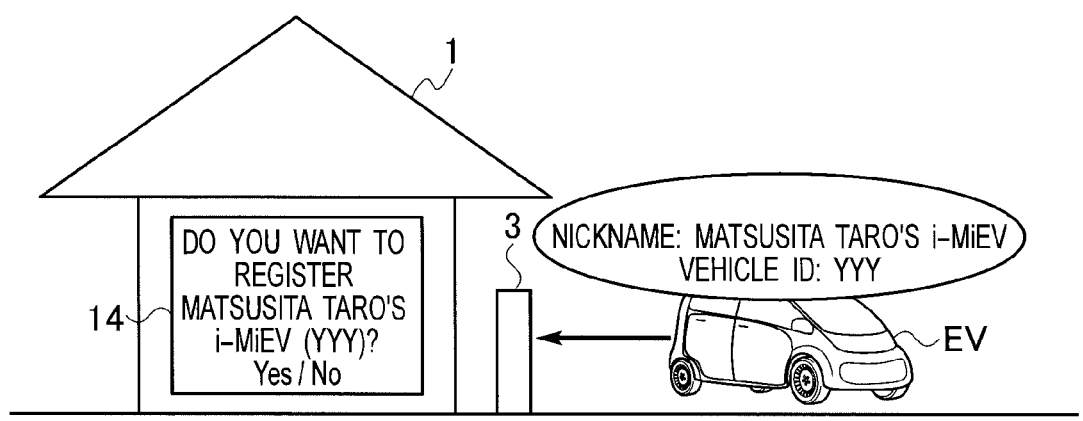
FIG. 4 is a view showing a storage table stored in an electric vehicle in the charge/discharge system as the second embodiment of the present invention.
FIG. 5 is a block diagram illustrating the configuration of a charge/discharge system as a third embodiment of the present invention.

The NW service system 30 acquires the area ID, the charger/discharger ID, and the electricity rate from each of the multiple chargers 21. The NW service system 30 then creates a storage table as shown in FIG. 4. In this storage table, the group ID (or area ID), the charger/discharger ID, and the electricity rate are related to each other. The charge cost (electricity rate) varies by area. When the charge/discharge system performs discharge to the charger 21 for the purpose of selling electricity, the NW service system 30 can acquire the discharge cost, too.

In the thus-configured charge/discharge system, the vehicle-mounted device 4 of the electric vehicle acquires through the input unit or communication unit, the area ID (or group ID) identifying the area where the charger 21 that has charged/discharged the electric vehicle is placed and the charge cost of the same area. In the second embodiment, the vehicle-mounted device 4 acquires the storage table of FIG. 4 stored in the NW service system 30 through the communication unit. Alternatively, the storage table of FIG. 4 may be inputted in the vehicle-mounted device 4 through the input unit upon the user's operation.

The storage unit of the vehicle-mounted device 4 stores the area ID (or group ID) and charge/discharge cost in relation to the charger/discharger ID indicating the charger 21 which has charged/discharged the same vehicle.

The NW service system 30 controls the electricity rate of each area (or group) in accordance with the demand and supply of electricity. For example, the charge/discharge cost of the charger 21 of the shop 20A is 20 yen/kWh. The charge/discharge cost of the charger 21 of the shop 20B is 10 yen/kWh. The charge/discharge cost of the charger 21 of the shop 20C is 30 yen/kWh. The vehicle-mounted device 4 presents the area identified by the area ID and the charge/discharge cost as the history information in relation to the pair of the charger 21 and vehicle ID related to the area. According to the charge/discharge system, it is possible to present information allowing charge/discharge by the charger 21 which is located in the area where the electricity rate is the lowest among the plural areas.

As described above, according to the charge/discharge system shown as the second embodiment, the places where the electric vehicle is charged or discharged are managed, and charge/discharge costs having different unit prices are visualized to be accurately distinguished. The charge/discharge system is therefore applicable to area energy management.

In the above description, the plural charger/discharger IDs are managed on a basis of area ID (group ID). However, the group ID may be used to manage vehicle IDs. For example, the vehicle IDs are managed by a group ID of a taxi company. The taxi company can thereby know the fuel costs collectively.

Moreover, the electricity prices of each group ID may be presented in ascending order of electricity prices or in ascending order of distance from the current location of the electric vehicle.

(Third Embodiment)

Next, a description is given of a charge/discharge system shown as a third embodiment of the present invention. The same portions as those of the aforementioned embodiment are given the same reference numerals, and the detailed description thereof is omitted.

The charge/discharge system shown as the third embodiment is configured to prevent the charger/discharger 3 from being illegally used by another charger/discharger 3 or the vehicle-mounted device 4.

As illustrated in FIG. 5, in this charge/discharge system, when being connected to the charger/discharger 3 for the first time, the electric vehicle sends "owner's nickname: XXXX's electric vehicle" and "vehicle ID: YYY" to the charger/discharger 3. The charger/discharger 3 transfers the "owner's nickname: XXXX's electric vehicle" and "vehicle ID: YYY" to the HEMS controller 14. The HEMS controller 14 confirms whether to resister the electric vehicle as an electric vehicle which is charged/discharged by the charger/discharger 3. In this process, the HEMS controller 14 causes the display in the house 1 to display a message: "Do you want to register XXXX's electric vehicle (YYY)?" and YES and NO buttons. When the YES button is operated, the HEMS controller 14 and charger/discharger 3 register that the electric vehicle is permitted to be charged/discharged by the charger/discharger 3.

Figure 6:
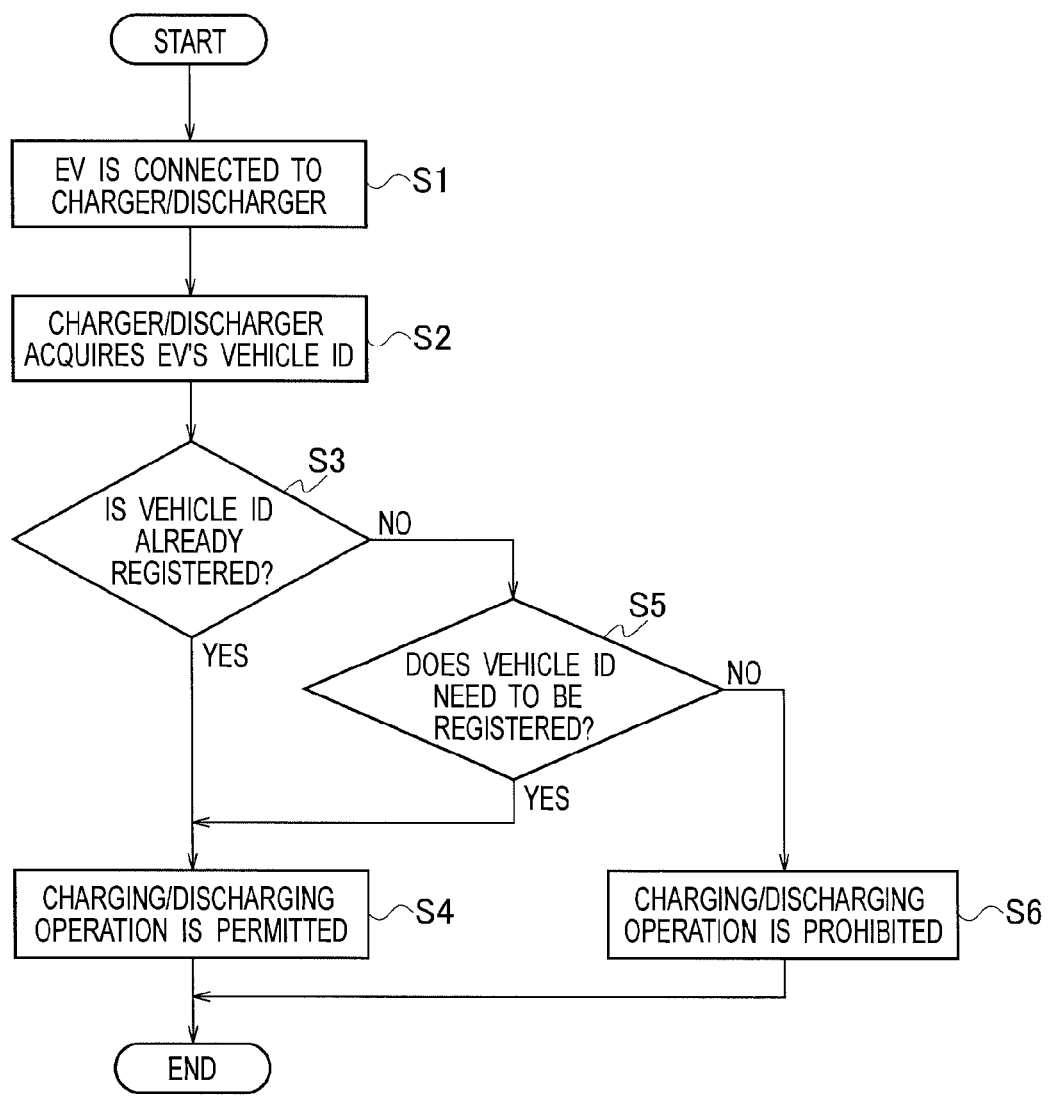
FIG. 6 is a flowchart showing the operation of the charge/discharge system as the third embodiment of the present invention.

When the electric vehicle initially registered is connected to the charger/discharger 3 (step S1) as shown in FIG. 6, the charger/discharger 3 acquires the vehicle ID of the electric vehicle (step S2). In this process, when the electric vehicle is connected to the charger/discharger 3, the vehicle ID stored in the storage unit is sent to the charger/discharger 3 through the communication unit of the vehicle-mounted device 4. The communication unit of the charger/discharger 3 receives the vehicle ID from the electric vehicle when being connected to the electric vehicle.

In step S3, the charger/discharger 3 determines whether the vehicle ID acquired in the step S2 is a vehicle ID already registered. When the vehicle ID acquired is already registered, the charger/discharger 3 permits the charging/discharging operation in step S4.

On the other hand, when the vehicle ID is not registered, the HEMS controller 14 determines whether to register the vehicle ID. When the vehicle ID is registered by the user's operation, the HEMS controller 14 registers the vehicle ID to the charger/discharger 3. The charger/discharger 3 then permits the charging/discharging operation in the step S4. On the other hand, when the vehicle ID is not registered, the charger/discharger 3 prohibits the charging/discharging operation in step S6. The permission and prohibition of the charging/discharging operation may be determined either by the vehicle-mounted device or by the charger/discharger 3.

As described above, according to this charge/discharge system, the charger/discharger 3 identifies whether to permit the charging/discharging operation for the electric vehicle. Whether to permit charge of electric vehicles is therefore determined by the charger/discharger 3, so that the charging operation is facilitated in the charge/discharge system.

Moreover, according to this charge/discharge system, the vehicle-mounted device 4 may be configured to identify whether to permit the charging/discharging operation by the charger/discharger 3. Whether to permit the charge of electric vehicles can be determined by the vehicle-mounted device 4, so that the charging operation is facilitated in the charge/discharge system.

In this embodiment, the charging operation and the discharging operation for the electric vehicle are collectively registered and managed. However, the present invention is not limited to such a configuration. The permission of the charging operation and the permission of the discharging operation may be separately managed for each electric vehicle. To be specific, the charge/discharge system may manage any one of the same by permitting only the charging operation or permitting only the discharging operation.

Furthermore, the charge/discharge system may include a function of displaying a list of vehicle IDs registered in the charger/discharger 3 on a screen of the HEMS controller 14 and deleting the vehicle ID selected.

Moreover, the aforementioned charge/discharge system is configured to register the vehicle ID of an electric vehicle in the charger/discharger 3 connected thereto but may be configured to register the vehicle ID to a group of plural charger/dischargers 3 when the electric vehicle is connected once.

Furthermore, the aforementioned charge/discharge system is configured to register the vehicle ID of an electric vehicle in the charger/discharger 3 connected thereto but may be configured to register vehicle IDs of electric vehicles having permissions of the charging/discharging operation all at once to the charger/discharger 3 from a PC, a smartphone, or the like.

Furthermore, the aforementioned charge/discharge system is configured to register the vehicle ID of an electric vehicle in the charger/discharger 3 connected thereto but may be configured to register vehicle IDs through card verification by the charger/discharger 3. Moreover, when an electric vehicle of a registered vehicle ID is not connected for a certain period of time, the registered vehicle ID may be deleted.

(Fourth Embodiment)

Next, a description is given of a charge/discharge system shown as a fourth embodiment of the present invention. The same portions as those of the aforementioned embodiment are given the same reference numerals, and the detailed description thereof is omitted.

In the charge/discharge system shown as the fourth embodiment, the vehicle-mounted device 4 starts operation corresponding to the behavior of the vehicle user according to an instruction which is sent from the electrical load 13 within the house 1 to be supplied via the charger/discharger 3.

The charge/discharge system shown as the fourth embodiment uses the communication unit of the charger/discharger 3 to send the instruction from the electrical load 13 to the electric vehicle and send to the electrical load 13, the matter that the electric vehicle is connected to the charger/discharger 3. The charge/discharge system thereby causes the vehicle-mounted device 4 in accordance with the instruction to start the operation corresponding to the behavior of the vehicle user and causes the electrical load 13 to start operation corresponding to the behavior of the vehicle user upon the connection of the electric vehicle.

The thus-configured charge/discharge system performs the following operation for a vehicle ID previously registered in the charger/discharger 3.

Figure 7:
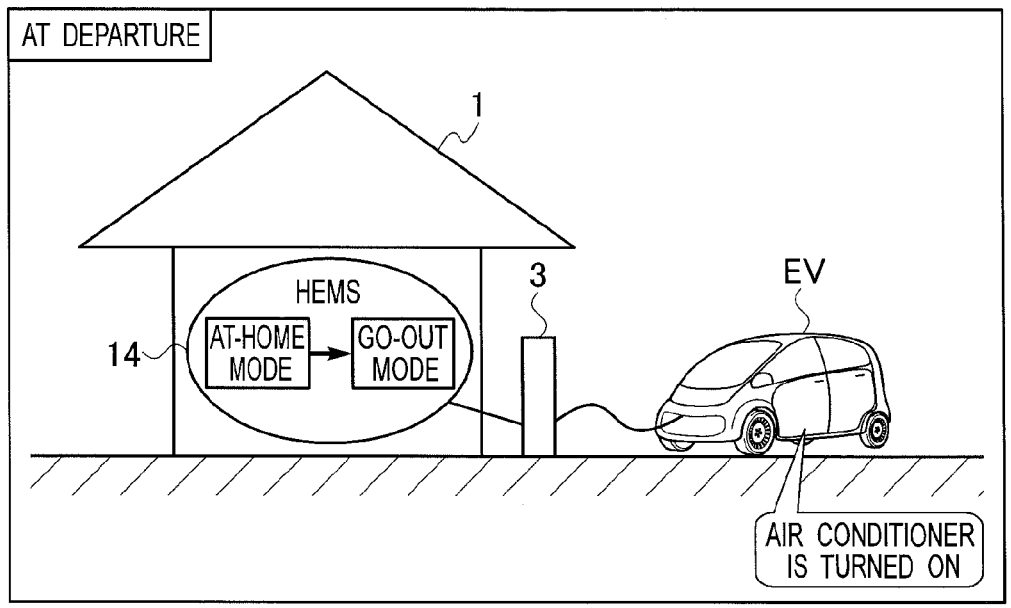
FIGS. 7A and 7B are block diagrams illustrating the operations of the charge/discharge system as a fourth embodiment of the present invention, FIG. 7A illustrating the operation at departure of the vehicle, FIG. 7B illustrating the operation when the vehicle comes home.
Figure 7:
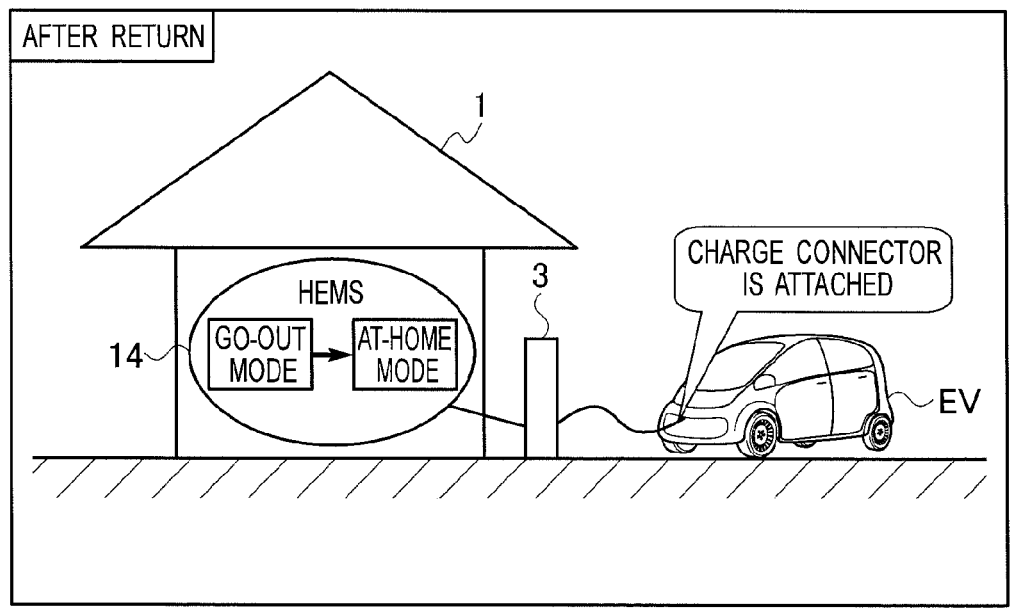

As shown in FIG. 7A, before the user's departure, first, (1) the user changes an "at-home mode" to a "going-out mode" by the HEMS controller 14. The at-home mode is an operation mode of not monitoring an intruder with a security device. On the other hand, the going-out mode is an operation mode of monitoring an intruder with a camera system, a motion sensor, or a window sensor and performs an alarming action with light or sound if necessary.

Next, (2) the HEMS controller 14 transmits to the vehicle-mounted device 4 via the charger/discharger 3, information indicating that the user is departing. The notification of information indicating the user's departure by the HEMS controller 14 but may be directly given to the electric vehicle from a smartphone carried by the user. The HEMS controller 14 may perform the aforementioned operation for the charger/discharger 3 having a charger/discharger ID previously registered.

Next, (3) the charger/discharger 3 acquires information on operating conditions (temperature, for example) of a living room air conditioner in the house 1 from the HEMS controller 14. The vehicle-mounted device 4 automatically conditions the air inside the electric vehicle to a comfortable temperature in accordance with the temperature inside of the house 1 acquired through the charger/discharger 3. The vehicle-mounted device 4 can thereby automatically turn on the air conditioner of the electric vehicle at the electric vehicle's departure.

As illustrated in FIG. 7B, when the user returns to the house 1, (1) the cable is connected to a charging connector of the electric vehicle by the user to connect the electric vehicle to the charger/discharger 3.

Next, (2) the charger/discharger 3 acquires the vehicle ID of the connected electric vehicle and recognizes that the vehicle ID corresponds to the user as a resident of the house 1. The charger/discharger 3 transmits to the HEMS controller 14, information indicating that the user has returned to the house 1. Desirably, the registration of the vehicle ID to the HEMS controller 14 is performed by the operation described in the third embodiment above. The HEMS controller 14 may permit the charging/discharging operation for electric vehicles corresponding to vehicle IDs previously registered.

Next, (3) the HEMS controller 14 changes the operation mode of the electrical load 13 from the going-out mode to the at-home mode. The air conditioner and illuminations in the living room as the electrical load 13 are thereby powered on (3).

As described above, according to the charge/discharge system, the electric vehicle can be controlled from the inside of the house 1 in accordance with the resident's behavior. According to the charge/discharge system, moreover, the electrical load 13 in the house 1 can be controlled from the electric vehicle in accordance with the resident's behavior. This can enhance the comfort obtained by use of the electric vehicle.

(Fifth Embodiment)

Next, a description is given of a charge/discharge system shown as a fifth embodiment of the present invention. The same portions as those of the aforementioned embodiment are given the same reference numerals, and the detailed description thereof is omitted.

The charge/discharge system shown as the fifth embodiment is configured to restrict the amount of discharge in the house 1 to within the amount of electricity charged at the house 1. This charge/discharge system prevents the electricity charged by a charger/discharger located outside of the house 1 from being discharged into the house 1 to be consumed by the electrical load 13 or sold from the house 1 to the outside.

Figure 8:
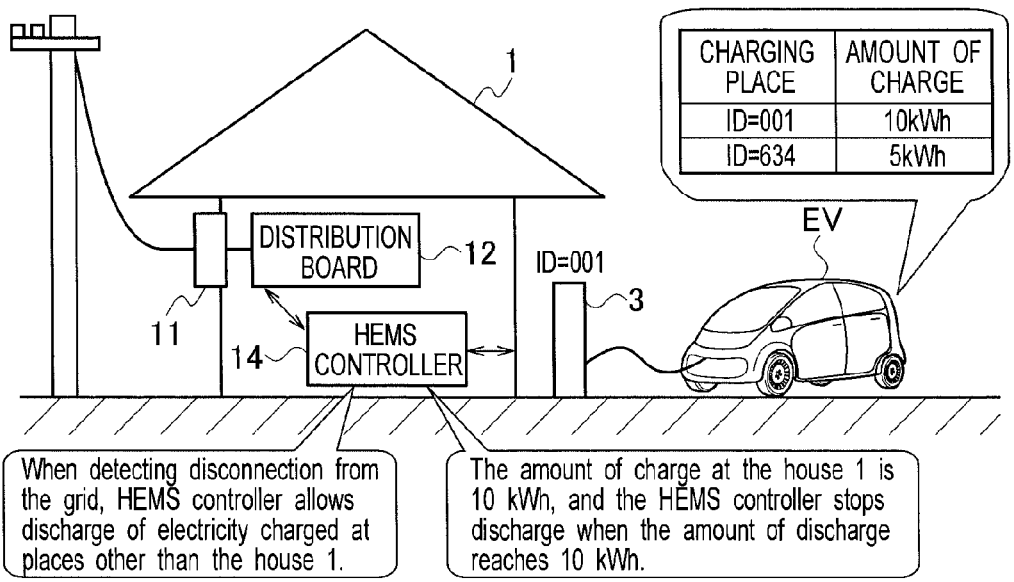
FIG. 8 is a block diagram illustrating the configuration of a charge/discharge system as a fifth embodiment of the present invention.

Accordingly, in the charge/discharge system, the electric vehicle stores a storage table that relates the electric vehicle to the charging place (charger/discharger ID) and the amount of charge as illustrated in FIG. 8. When the electric vehicle is connected to the charger/discharger 3, the communication unit of the vehicle-mounted device 4 sends the vehicle ID stored in the storage unit to the charger/discharger 3. The vehicle-mounted device 4 allows the corresponding electric vehicle to discharge electricity in a range not exceeding the previous amount of charge to the electric vehicle from the charger/discharger 3 connected thereto.

This charge/discharge system may control discharge of the electric vehicle by using the charger/discharger 3 instead of the vehicle-mounted device 4. The charger/discharger 3 stores a storage table that relates the charging place (charger/discharger ID) to the amount of charge. When the communication unit is connected to the electric vehicle, the charger/discharger 3 receives the vehicle ID from the connected electric vehicle. The charger/discharger 3 causes the electric vehicle to discharge electricity within a range not exceeding the previous amount of charge to the electric vehicle. The charger/discharger 3 thereby supplies discharged electricity to the house 1 within a range not exceeding the previous amount of charge to the electric vehicle.

The thus-configured charge/discharge system performs the following operation, for example. In this operation, the storage table is stored in the charger/discharger 3, and the charger/discharger 3 manages discharge of the electric vehicle.

At the process of charging the electric vehicle, (1) the electric vehicle is connected to the charger/discharger 3 with the cable in the charge/discharge system. The vehicle-mounted device 4 can thereby communicate with the charger/discharger 3. Next (2), the battery of the electric vehicle is charged from the charger/discharger 3. Next (3), the charger/discharger 3 acquires the date and time of charge/discharge, the vehicle ID, the amount of charge, which are stored in the vehicle-mounted device 4 of the electric vehicle. Next (4), the charger/discharger 3 adds the current amount of charge to the stored total amount of charges/discharges accumulated.

On the other hand, at the process of discharging the battery of the electric vehicle, (1) the electric vehicle is connected to the charger/discharger 3 with the cable. The vehicle-mounted device 4 can thereby communicate with the charger/discharger 3. Next (2), the charger/discharger 3 acquires the vehicle ID of the electric vehicle stored in the vehicle-mounted device 4 and reads out the total amount of charges and discharges stored in relation to the vehicle ID. Next (3), the charger/discharger 3 performs discharge from the battery of the electric vehicle with the upper limit set to the total amount of charges and discharges. When the discharge of the battery of the electric vehicle is completed, next (4), the charger/discharger 3 reduces the current amount of discharge from the total amount of charges and discharges. The charger/discharger 3 stops the discharge from the electric vehicle when the total amount of charges and discharges reaches 0.

Figure 9:
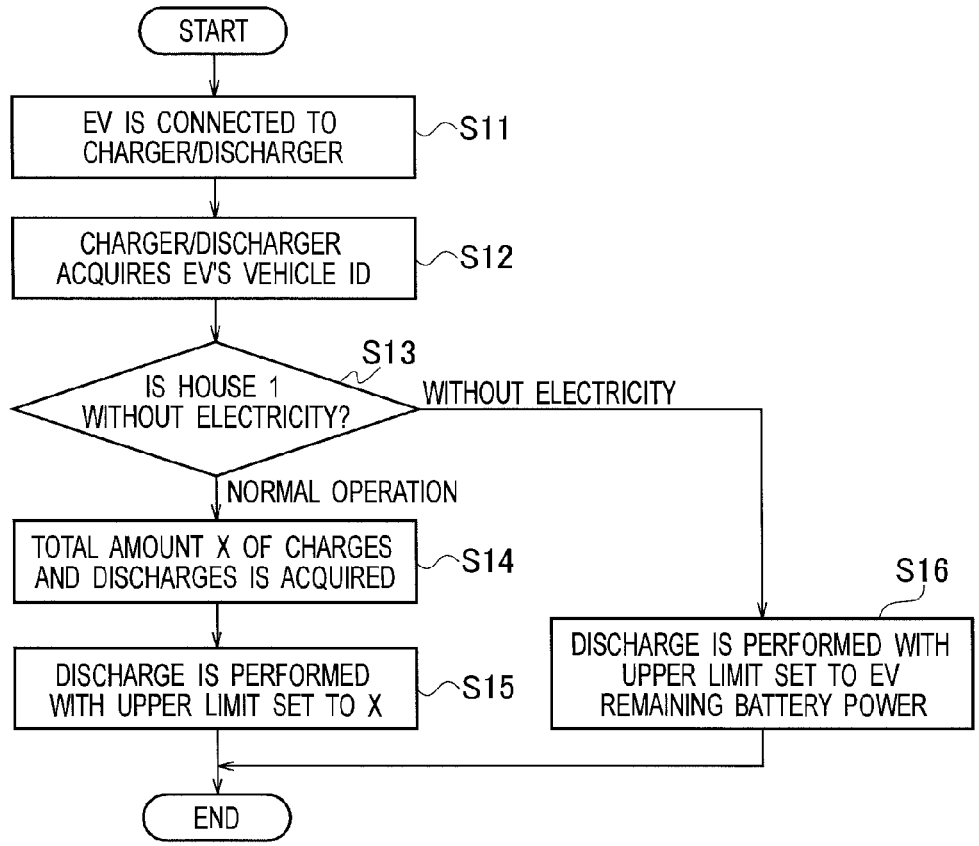
FIG. 9 is a flowchart showing the operation of the charge/discharge system as the fifth embodiment of the present invention.

The charger/discharger 3 of this charge/discharge system can perform a process shown in FIG. 9, for example.

First in step S11, the charger/discharger 3 detects connection with the electric vehicle. Then, the vehicle-mounted device 4 can communicate with the charger/discharger 3.

In the next step S12, the charger/discharger 3 acquires the vehicle ID of the electric vehicle stored in the vehicle-mounted device 4.

In the next step S13, the charger/discharger 3 determines whether the house 1 is without electricity where the supply of electricity from the grid power supply 2 is stopped. In this process, the HEM controller 14 detects that the power supply from the grid power supply 2 to the distribution board 12 is stopped. The charger/discharger 3 determines whether the house 1 is without electricity by communicating with the HEMS controller 14. When the house 1 is not without electricity at normal operation, the process goes to step S14, and when the house 1 is without electricity, the process goes to step S16.

In step S14, the charger/discharger 3 acquires the total amount X of charges and discharges corresponding to the vehicle ID acquired in the step S12.

In the next step S15, the charger/discharger 3 starts discharge from the battery of the electric vehicle with the upper limit being set to the total amount of charges and discharges acquired in the step S14.

On the other hand, when the house 1 is without electricity, in step S16, the charger/discharger 3 starts discharge from the battery of the electric vehicle with the upper limit being set to the remaining battery power of the electric vehicle corresponding to the vehicle ID acquired in the step S12.

Figures 10, 11:
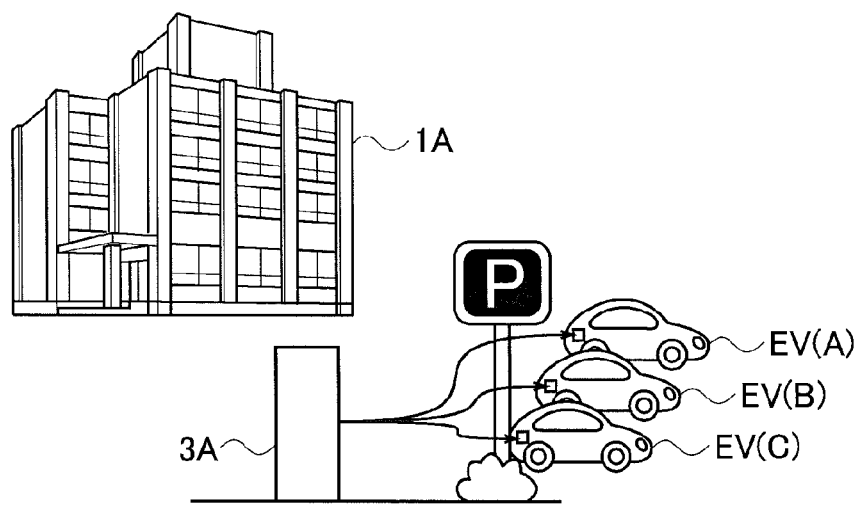
FIG. 10 is a view showing a storage table stored in a charger/discharger of the charge/discharge system as the fifth embodiment of the present invention.
FIG. 11 is a block diagram illustrating the configuration of the charge/discharge system as a sixth embodiment of the present invention.

The charger/discharger 3 stores a storage table as shown in FIG. 10, for example. The charger/discharger 3 acquires the vehicle ID from the vehicle-mounted device 4 each time an electric vehicle is connected thereto. The charger/discharger 3 stores the amount of charge or discharge for the battery of the electric vehicle each time the charge or discharge for the electric vehicle is completed. The charger/discharger 3 stores the amount of charge as a positive value and stores the amount of discharge as a negative value, thus updating the storage table.

When being connected to the charger/discharger 3 through the cable, the vehicle-mounted device 4 supplies information about the amount of electricity consumed by travel of the electric vehicle to the charger/discharger 3. The charger/discharger 3 can thereby recognize the current remaining battery power of the battery of the electric vehicle.

For example, as shown in FIG. 10, it is registered in the storage table that the total amount of charges and discharges for the battery of an electric vehicle whose vehicle ID is XXX is 25 kWh. Accordingly, the charger/discharger 3 can recognize that the upper limit of the amount of electricity that can be discharged from the battery of the electric vehicle is 25 kWh. The charger/discharger 3 can thereby cause the battery of the electric vehicle to discharge electricity to the above upper limit and supply the same to the house 1.

As the amounts of charges of the battery of the electric vehicle are integrated, the amount of electricity that can be discharged could increase without limitation. The charger/discharger 3 may set the upper limit of the total amount of charges and discharges to the maximum amount of charge of the battery of the electric vehicle. Moreover, in order to prevent the total amount of charges and discharges from becoming negative during periods when the house 1 is without electricity, the charger/discharger 3 may stop counting the amount of discharge during periods when the house 1 is without electricity.

As described above, according to the charge/discharge system, the charger/discharger 3 or vehicle-mounted device 4 allows the battery of the electric vehicle to discharge electricity up to the amount of charge from a specific charger/discharger 3 and supply the discharged electricity to the house 1 through the charger/discharger 3. Accordingly, this charge/discharge system restricts the amount of discharge to the house 1 to within the amount of charge at the house 1 as a house of an owner of the electric vehicle. According to the charge/discharge system, it is therefore possible to prevent electricity from being illegally used in such a manner that the battery electricity of the electric vehicle charged outside of the house 1 is used in the house 1 or sold.

Moreover, the charge/discharge system allows the electric vehicle to discharge the remaining battery power when the house 1 is without electricity. According to the charge/discharge system, it is possible to permit use of electricity of the electric vehicle so that the electricity charged outside of the house 1 is supplied to the house 1 only at emergencies where the house 1 has lost power.

(Sixth Embodiment)

Next, a description is given of a charge/discharge system shown as a sixth embodiment of the present invention. The same portions as those of the aforementioned embodiment are given the same reference numerals, and the detailed description thereof is omitted.

The charge/discharge system shown as the sixth embodiment is configured to control the amount of charge to the battery of each electric vehicle based on the location of the charger/discharger 3 and the destination of the electric vehicle. As illustrated in FIG. 11, for example, in a collective housing 1A such as an apartment, for example, the number of charger/dischargers 3 is smaller than the number of electric vehicles connected to the charger/dischargers 3 in some cases. In this case, the batteries of all the electric vehicles cannot be fully charged before drive because each charger/discharger 3 has a limitation in the amount of discharge per unit time. The charger/discharger 3 therefore controls the amount of charge of each electric vehicle based on the location of the charger/discharger 3 and the destination of the electric vehicle.

As shown in FIG. 12A, for example, the charger/discharger stores charger location information that relates the charger/discharger ID to the latitude and longitude information. The charger/discharger 3 stores latitude and longitude information as the destination information in relation to the vehicle IDs as shown in FIG. 12B. When the charger/discharger 3 is connected to each vehicle-mounted device 4 through the cable, the destination information is sent from the vehicle-mounted device 4 to the charger/discharger device 3 together with the vehicle ID.

This charge/discharge system performs the following operation, for example. As for this operation, a description is given of the case where the charger/discharger 3 stores the storage table and manages discharges of electric vehicles.

In this charge/discharge system, at the process of charging batteries of the electric vehicles, (1) each electric vehicle is connected to the charger/discharger 3 through the cable. Next (2), the charger/discharger 3 acquires the vehicle ID from the vehicle-mounted device 4 and acquires the latitude and longitude of the destination as the destination information of the electric vehicle from the vehicle-mounted device 4. Next (3), the charger/discharger 3 calculates the travel distance of the electric vehicle based on the latitude and longitude of the destination and the latitude and longitude of the charter/discharger 3. The charger/discharger 3 calculates the minimum amount of charge necessary for the electric vehicle to move the travel distance. Next (4), the charger/discharger 3 charges the battery up to at least the amount of charge calculated in (3).

The charge/discharge system may be configured to discharge the battery of the electric vehicle connected thereto at emergencies, for example. At the process of discharging the battery of the electric vehicle, the charger/discharger 3 performs the aforementioned (1) to (3) for the charging operation and calculates the minimum amount of charge necessary for the electric vehicle to move the calculated travel distance. The charger/discharger 3 discharges the battery of the electric vehicle so that the amount of charge of the electric vehicle does not fall below the calculated amount of charge.

In the aforementioned embodiment, the amounts of charge and discharge of the battery of the electric vehicle are set by the charger/discharger 3. However, the vehicle-mounted device 4 may be configured to calculate the travel distance based on the current position information and destination information of the electric vehicle and thereby calculate the necessary minimum amount of charge and the amount of discharge.

As described above, according to the charge/discharge system, even when batteries of plural electric vehicles need to be charged by one charger/discharger 3, the battery of each electric vehicle can ensure the necessary minimum amount of charge.

When the electric vehicles are delivery cars, the charger/discharger 3 or vehicle-mounted device 4 may be configured to determine a delivery route based on the delivery schedule and calculate the amount of charge necessary for each delivery car to move along the delivery route. The charge/discharge system can thereby efficiently charge the batteries of the plural electric vehicles.

The travel distance is calculated by using the current locations of the charger/discharger 3 and electric vehicles and the latitude and longitude information relating to the destination information in the above description but may be a distance obtained using a route number.

(Seventh Embodiment)

Next, a description is given of a charge/discharge system shown as a seventh embodiment of the present invention. The same portions as those of the aforementioned embodiment are given the same reference numerals, and the detailed description thereof is omitted.

Figures 12, 13:
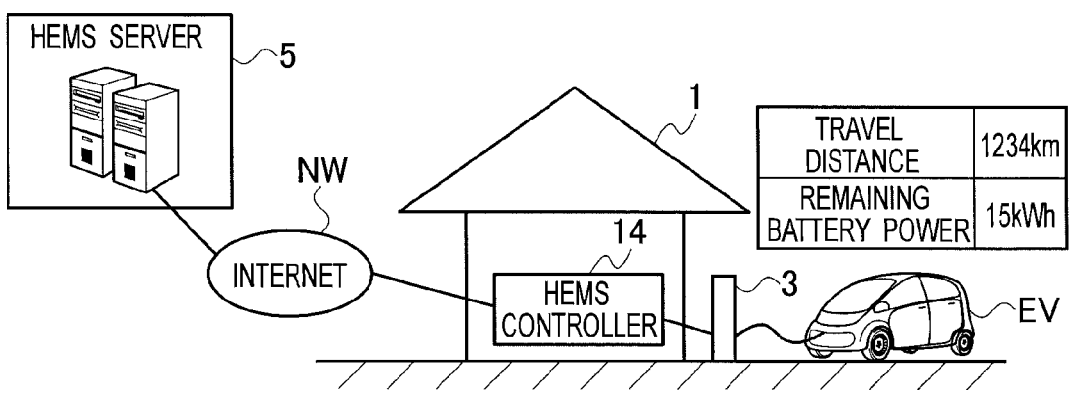
FIG. 13 is a block diagram illustrating the configuration of a charge/discharge system as a seventh embodiment of the present invention.

The charge/discharge system shown as the seventh embodiment is configured to present information in addition to the history information indicating the history of charges and discharges for the battery of the electric vehicle as shown in the first embodiment, implementing visualization of the information. As illustrated in FIG. 13, for example, in the charge/discharge system, the HEMS controller 14 is connected to an HEMS server 5 outside of the house 1 through a network NW such as the Internet to present the average mileage of the electric vehicle, thus implementing visualization.

The charge/discharge system performs the following operation, for example.

In this charge/discharge system, in the process of charging the battery of the electric vehicle, first, (1) the electric vehicle is connected to the charger/discharger 3 through the cable.

Next (2), the charger/discharger 3 acquires from the vehicle-mounted device 4, the vehicle ID, the travel distance, and the remaining battery power (the amount of charge remaining). The charger/discharger 3 may acquire the amount of electricity consumed by travel of the electric vehicle from the vehicle-mounted device 4.

Next (3), the charger/discharger 3 calculates the average mileage from the travel distance and electricity consumption of the electric vehicle. The charger/discharger 3 sends the calculated average mileage to the HEMS controller 14 each time when the data is acquired, for example. The HEMS controller 14 can then store the average mileage data of the electric vehicle.

Figures 14, 15:
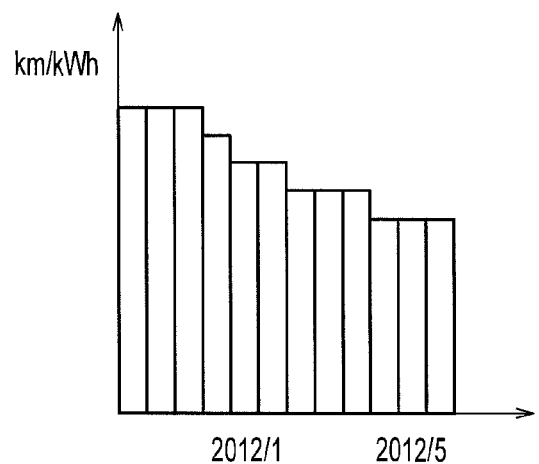
FIG. 14 is a view showing a storage table stored in a charger/discharger of the charge/discharge system as a seventh embodiment of the present invention.
FIG. 15 is a diagram showing an example of the graph displayed by the charge/discharge system as the seventh embodiment of the present invention.

In the HEMS controller 14, a storage table shown in FIG. 14 is created, for example. This storage table includes the data acquisition date and time, the vehicle ID, the amount of discharge due to travel of the electric vehicle, the travel distance, and the average mileage. The calculation of the average mileage may be performed by the EMS controller 14 instead of the charger/discharger 3.

The HEMS controller 14 presents transition of the average mileage of the electric vehicle on a not-shown display screen of the house 1, thus implementing visualization. The average mileage may be displayed on the display screen of the charger/discharger 3, the vehicle-mounted device 4, such as a car navigation system, of the electric vehicle, or on a smartphone of the user. The average mileage may be put on a graph with respect to the date of use of the electric vehicle as shown in FIG. 15.

Next (4), the HEMS controller 14 sends the data stored in the storage table to the HEMS server 5. The HEMS server 5 stores data of the electric vehicle. The data may be sent when the storage table is updated or sent at predetermined intervals.

The data stored in the HEMS server 5 can be downloaded by a communication device having a particular authority. For example, the HEMS server 5 may be configured to be accessible by a personal computer operated by a resident of the house 1, and the average mileage can be thereby seen at the personal computer in the house 1. The HEMS server 5 may be configured to be accessible by a personal computer equipped in a maintenance company of the electric vehicle. The personal computer of the maintenance company can thereby download the information of the electric vehicle and send a maintenance date of the electric vehicle to the personal computer at the house 1. Accordingly, the maintenance of the electric vehicle can be carried out at an appropriate time in accordance with the usage situation of the electric vehicle.

As described above, according to the charge/discharge system, the situation of the electric vehicle can be presented by the HEMS controller 14, thus implementing visualization. Furthermore, according to the charge/discharge system, the data of the electric vehicle is sent to the HEMS server 5, and the condition of the electric vehicle can be thereby presented to the resident of the house 1 or another person, thus implementing visualization.

In addition to the mileage, the HEMS controller 14 can multiply the mileage by the electricity rate used at the process of charging the battery of the electric vehicle and present the running cost of the electric vehicle, thus implementing visualization. Moreover, the HEMS controller 14 may be configured to compare the mileage of the electric vehicle with the mileage of a gas vehicle. The HEMS controller 14 can be configured to present investment recovery of the electric vehicle including the initial cost and running cost, thus implementing visualization. Furthermore, as for the display of the average mileage, the charge/discharge system may present either the average mileage of only one electric vehicle or the average mileage of a plurality of electric vehicles.

The aforementioned embodiments are just examples of the present invention. Accordingly, the present invention is not limited to the aforementioned embodiments, and it is certain that in addition to the embodiments, the present invention can be changed variously in accordance with the design and the like without departing from the technical idea according to the present invention.

In the aforementioned charge/discharge system, the vehicle-mounted device 4 and charger/discharger 3 individually include communication functions of exchanging information with each other, and both or one of the vehicle-mounted device 4 and charger/discharger 3 only needs to include an essential configuration. To be specific, both or one of the vehicle-mounted device 4 and charger/discharger 3 needs to include the input unit receiving various types of information. Moreover, both or one of the vehicle-mounted device 4 and charger/discharger 3 needs to include the storage unit that is configured to use the acquired information to store the vehicle ID identifying the vehicle, the charger/discharger ID identifying the charger/discharger which can be connected to the vehicle, and history information indicating a history of charges and discharges for the vehicle, which are related to one another. Furthermore, both or one of the vehicle-mounted device 4 and carger/discharger 3 only needs to include the presentation unit configured to present the history information stored in the storage unit to the user of the vehicle in relation to the pair of the vehicle ID and the charger/discharger identified by the charger/discharger ID that has performed charge and discharge.

The entire contents of Japanese Patent Application No. 2012-037199 (filed on: Feb. 23, 2012) are incorporated by reference.

INDUSTRIAL APPLICABILITY

According to the present invention, the vehicle ID, charger/discharger ID, and history information are related to each other to be stored, and the history information is presented to the vehicle user in relation to the pair of the vehicle ID and the charger/discharger which has performed the charge/discharge and is identified by the charger/discharger ID. It is therefore possible to present the cost required for the vehicle and the like and prepare an environment in which the user can easily use a vehicle.

REFERENCE SIGNS LIST

3 CHARGER/DISCHARGER
4 VEHICLE-MOUNTED DEVICE
13 HEMS CONTROLLER
21 CHARGER

The invention claimed is:

1. A vehicle-mounted apparatus mounted in a vehicle which can be charged and discharged by a charger/discharger, the vehicle-mounted apparatus comprising:
   a communication unit which, when connected to the charger/discharger, exchanges information with the charger/discharger;
   an input unit receiving various types of information;
   a storage unit which, by utilizing information acquired through the input unit and information acquired from the charger/discharger through the communication unit, stores: a vehicle ID identifying the vehicle; a charger/discharger ID identifying the charger/discharger which has been connected to the vehicle; and history information indicating a history of charges and discharges for the vehicle, which are related to one another; and
   a presentation unit which presents the history information stored in the storage unit to a user of the vehicle in relation to a pair of the vehicle ID and the charger/discharger which has charged/discharged the vehicle and is identified by the charger/discharger ID.

2. The vehicle-mounted apparatus according to claim 1, wherein
   the vehicle-mounted apparatus acquires an area ID identifying an area where the charger/discharger charging/discharging the vehicle is placed and a charge/discharge cost of the area through the input unit or the communication unit,
   the storage unit stores the area ID and the charge/discharge cost in relation to the charger/discharger ID, and
   the presentation unit presents the area identified by the area ID and the charge/discharge cost as the history information in relation to a pair of the charger/discharger ID related to the area and the vehicle ID.

3. The vehicle-mounted apparatus according to claim 1, wherein the communication unit sends the vehicle ID stored in the storage unit to the charger/discharger when the vehicle is connected to the charger/discharger.

4. The vehicle-mounted apparatus according to claim 1, wherein the vehicle-mounted apparatus starts operation corresponding to a behavior of the user of the vehicle designated by the user, in accordance with an instruction which is sent from a home appliance and is supplied through the charger/discharger.

5. The vehicle-mounted apparatus according to claim 1, wherein the communication unit sends the vehicle ID stored in the storage unit to the charger/discharger when the vehicle is connected to the charger/discharger, and the vehicle is allowed to discharge electricity within a range not exceeding a previous amount of charge to the vehicle from the connected charger/discharger.

6. The vehicle-mounted apparatus according to claim 1, wherein the vehicle provided with the vehicle-mounted apparatus is connected to the charger/discharger together with another vehicle, and the amount of charge to the vehicle provided with the vehicle-mounted apparatus is set based on a current location and a current destination of the vehicle including the vehicle-mounted apparatus.

7. A charger/discharger for charging/discharging a battery of a vehicle, the charger/discharger comprising:

a communication unit which, when connected to the vehicle, exchanges information with the vehicle;

an input unit which receives various types of information; and a storage unit which, by utilizing information acquired through the input unit and information acquired from the vehicle through the communication unit, stores: vehicle IDs identifying vehicles; a charger/discharger ID identifying the charger/discharger; and history information indicating a history of charges and discharges of each vehicle ID, which are related to one another; and a presentation unit which presents to a user of the vehicle, the history information stored in the storage unit on a basis of each vehicle ID, wherein the communication unit sends an instruction received from a home appliance to a vehicle and sends information that the vehicle is connected to the home appliance, and the charger/discharger causes a vehicle-mounted apparatus to start operation corresponding to a behavior of the user of the vehicle designated by the user, in accordance with the instruction and causes the home appliance to start operation corresponding to the behavior of the user of the vehicle upon connection of the vehicle.

8. A charger/discharger for charging/discharging a battery of a vehicle, the charger/discharger comprising:

a communication unit which, when connected to the vehicle, exchanges information with the vehicle;

an input unit which receives various types of information; and a storage unit which, by utilizing information acquired through the input unit and information acquired from the vehicle through the communication unit, stores: vehicle IDs identifying vehicles; a charger/discharger ID identifying the charger/discharger; and history information indicating a history of charges and discharges of each vehicle ID, which are related to one another; and a presentation unit which presents to a user of the vehicle, the history information stored in the storage unit on a basis of each vehicle ID, wherein when being connected to a vehicle, the communication unit receives a vehicle ID from the vehicle, and the charger/discharger receives from the vehicle electricity within a range not exceeding a previous amount of charge.

9. A charger/discharger for charging/discharging a battery of a vehicle, the charger/discharger comprising:

a communication unit which, when connected to the vehicle, exchanges information with the vehicle;

an input unit which receives various types of information; and a storage unit which, by utilizing information acquired through the input unit and information acquired from the vehicle through the communication unit, stores: vehicle IDs identifying vehicles; a charger/discharger ID identifying the charger/discharger; and history information indicating a history of charges and discharges of each vehicle ID, which are related to one another; and a presentation unit which presents to a user of the vehicle, the history information stored in the storage unit on a basis of each vehicle ID, wherein when being connected to a plurality of vehicles, the communication unit acquires vehicle IDs and destination information from the plurality of vehicles, and an amount of charge of each of the plurality of vehicles connected is set so that the vehicle can move a travel distance which is calculated based on the location of the charger/discharger and the destination information.

10. A charge/discharge system comprising:

a vehicle-mounted apparatus mounted in a vehicle; and a charger/discharger which charges/discharges a battery of the vehicle, wherein the vehicle-mounted apparatus and the charger/discharger include communication units, respectively, for exchanging information with each other, at least one of the vehicle-mounted apparatus and the charger/discharger includes:

an input unit receiving various types of information;

a storage unit which, by utilizing information acquired through the input unit and information acquired through the communication unit, stores: a vehicle ID identifying the vehicle, a charger/discharger ID identifying the charger/discharger which has been connected to the vehicle; and history information indicating a history of charges and discharges for the vehicle; and a presentation unit which presents the history information stored in the storage unit to a user of the vehicle in relation to a pair of the vehicle ID and the charger/discharger which has charged/discharged the vehicle and is identified by the charger/discharger ID.

* * * * *